United States Patent [19]

Kowalczyk

[11] Patent Number: 5,004,487

[45] Date of Patent: Apr. 2, 1991

[54] FILTER ASSEMBLY FOR PROTECTING MOTOR VEHICLE OCCUPANTS FROM POLLUTION

[76] Inventor: Thaddeus Kowalczyk, 8163 Lochdale, Dearborn Heights, Mich. 48127

[21] Appl. No.: 485,230

[22] Filed: Feb. 27, 1990

Related U.S. Application Data

[63] Continuation-in-part of Ser. No. 337,943, Apr. 13, 1989, abandoned, which is a continuation-in-part of Ser. No. 239,386, Sep. 1, 1988, abandoned.

[51] Int. Cl.⁵ .................................... B01D 46/12
[52] U.S. Cl. ..................................... 55/269; 55/274; 55/316; 55/385.3; 55/387; 55/419; 55/485; 55/486; 55/DIG. 34
[58] Field of Search ............... 55/208, 267, 274, 316, 55/332, 385.3, 387, 419, 483, 485–489, 497, 503, 528, DIG. 34, 268, 269

[56] References Cited

U.S. PATENT DOCUMENTS

| | | | |
|---|---|---|---|
| 2,146,071 | 2/1939 | Horvath | 55/267 X |
| 2,213,016 | 8/1940 | Perkins | 55/267 X |
| 2,213,017 | 8/1940 | Perkins | 55/267 X |
| 2,221,891 | 11/1940 | Young | 55/267 X |
| 2,237,452 | 4/1941 | Samuels et al. | 55/267 X |
| 2,240,368 | 4/1941 | LeFevre | 55/316 X |
| 2,634,671 | 4/1953 | Puidokas | 55/487 X |
| 2,881,854 | 4/1959 | Uehre, Jr. | 55/316 |
| 3,144,315 | 8/1964 | Hunn | 55/274 |
| 3,552,103 | 1/1971 | Smith | 55/486 |
| 3,738,088 | 6/1973 | Colosimo | 55/274 X |
| 3,742,684 | 7/1973 | Wait, Jr. | 55/267 X |
| 3,941,034 | 3/1976 | Helwig et al. | 55/316 X |
| 4,121,916 | 10/1978 | Fricke | 55/316 |
| 4,236,902 | 12/1980 | Fricke | 55/316 X |
| 4,343,149 | 8/1982 | Abthoff et al. | 55/487 X |
| 4,382,440 | 5/1983 | Kapp et al. | 55/316 X |
| 4,530,817 | 7/1985 | Hölter et al. | 55/267 X |
| 4,531,453 | 7/1985 | Warman et al. | 55/332 X |
| 4,597,323 | 7/1986 | Mordau et al. | 55/487 X |
| 4,610,703 | 9/1986 | Kowalczyk | 55/274 |
| 4,629,479 | 12/1986 | Cantoni | 55/274 |
| 4,658,707 | 4/1987 | Hawkins et al. | 55/316 X |
| 4,671,810 | 6/1987 | Dietzsch et al. | 55/316 X |
| 4,684,381 | 8/1987 | Wasylyniuk | 55/316 |
| 4,702,753 | 10/1987 | Kowalczyk | 55/267 |
| 4,722,747 | 2/1988 | Armbruster | 55/316 |
| 4,726,823 | 2/1988 | Brice | 55/274 |
| 4,743,279 | 5/1988 | Kvist et al. | 55/316 |
| 4,751,501 | 6/1988 | Gut | 55/274 X |

FOREIGN PATENT DOCUMENTS

| | | | |
|---|---|---|---|
| 2839368 | 3/1980 | Fed. Rep. of Germany | 55/316 |
| 3444126 | 6/1986 | Fed. Rep. of Germany | 55/316 |
| 1331998 | 9/1973 | United Kingdom | 55/316 |

Primary Examiner—Robert Spitzer

[57] ABSTRACT

This invention is a filter assembly to be installed in passenger motor vehicles for the protection of the occupants from pollution originating from either exterior the vehicle and/or interior the vehicle. The assembly is preferably installed in the plenum of the vent which is connected to the cowl plenum chamber of the vehicle's heating-cooling system. The assembly is also preferably equipped with a sensor switch that notifies the drive whenever the filter becomes dirty and must be replaced. The assembly includes a hot fluid heater, such as a hot water heater, which protects the filter from freezing and keeps the filter dry. The assembly prevents pollutants, which are emitted from the exhaust fumes of motor vehicles, as well as odors, hydrocarbons, smoke, soot, dust and allergens-pollen from polluting the motor vehicle interior. By installing the filter assembly in motor vehicles, we can be assured of breathing purer air.

3 Claims, 5 Drawing Sheets

FILTER ASSEMBLY FOR PROTECTING MOTOR VEHICLE OCCUPANTS FROM POLLUTION

CROSS REFERENCE TO RELATED APPLICATIONS AND PATENTS

This is a continuation-in-part application of U.S. Ser. No. 337,943, filed Apr. 13, 1989 and is a continuation-in-part application of U.S. Ser. No. 239,386, filed Sept. 1, 1988, both now abandoned, is related to my earlier U.S. Pat. No. 4,610,703, issued Sept. 9, 1986, and U.S. Pat. No. 4,702,753, issued Oct. 27, 1987.

TECHNICAL FIELD

This invention relates to a filter assembly for cleaning the air which enters the motor vehicle's interior and/or the ambient interior air within a motor vehicle.

BACKGROUND ART

The whole world is becoming one great highway owing to the greater availability of motor vehicles to people the world over. The only air that the driver and passengers can breathe is the air in the motor vehicle which enters the interior through inlets in the heating-cooling system. That air is polluted by the exhaust fumes emitted from the motors of passing motor vehicles, and allergens-pollen.

Many years have passed since the invention of the motor vehicle. Today, there are millions of them and increasingly more of those that make use of fuel, diesel fuel and alcohol. Built in various sizes, they burn various fuels and emit exhaust fumes that pollute the air, particularly certain older motor vehicles with improperly working engines which pollute the air even more. These motor vehicles are used for various purposes: to transport people in buses, for instance. Certain jobs require that we spend many hours in motor vehicles. Almost every person uses a motor vehicle for various reasons. In all of this we inhale polluted air. To this day, all that has been done to protect people from exhaust fumes is to have installed an exhaust system catalytic converter and return a portion of the exhaust fumes for a secondary burning.

One of the greatest needs in our motor vehicles today is to install a filter assembly to clean the air pulled into and the existing air inside the motor vehicle of pollutants. Such an assembly could be installed in the plenum of the fresh air inlet which is connected to the cowl plenum chamber of the heating-cooling system and also in the circulating inlet in new and existing automobiles. During production in new automobiles, a fresh air inlet which has to be an appropriate amount of square inches area to allow sufficient air into the interior of the motor vehicle. In this fresh air inlet is installed a filter assembly, and also in the circulating inlet to clean the air pulled into and the existing air inside the motor vehicle of pollutants or only one filter assembly would be installed in the plenum between the blower and evaporator, so that it would be in line with air entering the vehicle and being pulled into the vehicle interior by the blower through the outside vent. Such an assembly could be composed of a number of appropriate components that depollute the air, and could be constructed in such a way as to increase the surface of the filter.

DISCLOSURE OF THE INVENTION

An object of the present invention as applied to motor vehicle is to provide a filter assembly which protects health, and in certain cases prevents outright poisoning.

In carrying out the above object and other objects of the present invention, a filter assembly for use in an air heating-cooling system for the passenger compartment of a motor vehicle having a source of hot liquid is provided. The system includes a plenum and the assembly is positioned in the plenum. The assembly includes a housing containing a replaceable filter element having multiple layers which provide a surface area for contact with air passing there through from an upstream position to a downstream position adjacent the filter element to raise the temperature of the air in the path of air flowing through the filter element. The heater comprises a hot liquid heater and means are provided for supplying hot liquid from the source of hot liquid to the hot liquid heater.

The assembly is an improvement over my devices disclosed in U.S. Pat. No. 4,610,703 issued Sept. 9, 1986, and U.S. Pat. No. 4,702,753 issued Oct. 27, 1987. These improvements consist of: (1) a hot fluid/water heater which protects the filter element of the assembly from freezing and keeps the filter dry, and also is safer to use and less expensive than a resistance heater; (2) An easily adaptable remodeled assembly including a filter element which is installed in fresh air inlet and also may be located in the circulating inlet that can be installed in all new and existing automobiles; its function is to clean the polluted air coming from the outside and/or the existing air polluted by passengers inside the automobile, also will purify the air of small particles-of components of the filter from leaving the filter and; (3) during production in new automobiles easy installation of a filter assembly in fresh air inlet and also may be located in the circulation inlet will clean the polluted air coming from the outside and/or the existing air polluted by passengers inside the automobile, or only one filter assembly can be installed in the plenum, it will clean the polluted air coming from the outside and/or the existing air polluted by passenger inside the automobile. The blower must be appropriately constructed to produce enough force to pull a sufficient amount of air through the filter.

The filter element housed in the container or housing of the assembly preferably includes quality artificial water-resistant fibers and activated charcoal to remove pollutants emitted from the exhaust fumes of the motor vehicle, as well as hydrocarbons, odors, soot, smoke, dust, and allergens-pollen from the air which enters the motor vehicle interior. A hot water heater is preferably mounted to protect the filter element from freezing and keep it dry. Also, a sensor switch mounted in the assembly notifies the driver whenever the filter becomes dirty.

The moment this invention finds use in motor vehicles, it will help prevent poisoning in certain cases and will certainly insure better health for motor vehicle drivers and passengers. It will be especially helpful for people suffering from emphysema, asthma, and all kinds of allergies, and it also protects the evaporator and heater core of the vehicle from becoming clogged with dirt. The Assembly of the present invention can be constructed so as to include a convex, flat, rectangular, circular or square replaceable filter element, some of which will increase the surface area. This eliminates a substantial amount of air pollution entering the motor vehicle interior for long periods of use before becoming clogged with dirt. The assembly is a small and simple constructed apparatus which is easily installed in all passenger motor vehicles and contains a replaceable inside filter element.

The container of the convex-shaped assembly is designed so that its largest cross-sectional area is substantially greater than the cross-section area of the air inlet and the air outlet of the container. The container of the flat shaped filter is designed so that its largest cross-sectional area is substantially greater than the cross-section area only of the air outlet of the container, which has to fit the fresh air inlet located in the automobile.

The container consists of one or two closed parts in which there is housed the replaceable filter element. In one part of the container on the inlet side is mounted the hot water heater. A sensor switch is mounted in the other part of the container on the outlet side to inform the operator when the filter needs to be changed. This sensor switch is closed by a spring to cause a warning light associated with the assembly to illuminate on the instrument panel. If the filter element is clean, use of the blower will cause the air to push away from the sensor plate and prevent the warning light on the instrument panel from illuminating. When the filter element becomes dirty, the air being drawn by the blower will diminish in strength and not be able to move the sensor plate, thereby causing the warning light to illuminate.

The assembly prevents the ingestion of pollutants emitted through exhaust fumes, hydrocarbons, odors, smoke, soot, dust and allergens from the air which enters the motor vehicle interior, and also cleans the air which is polluted by passengers (such as odors and cigarette smoke). The assembly eliminates a substantial amount of air pollution. A large cabin of a motor vehicle requires more force to suck in or blow in the appropriate amount of air. An additional vent is appropriately constructed from the exterior of the motor vehicle and is connected to the cowl plenum chamber of the heating-cooling system in which the assembly is installed. Then the motor vehicle is in motion, this vent will allow the air to enter by dint of air resistance, so that the air will flow easily through the filter and it will be easier for the blower inside it to suck and push the air into the interior of the motor vehicle. Also, a vacuum blower can be installed in the plenum upstream of the assembly to ensure that an appropriate amount of air enters the interior of the motor vehicle.

BEST MODE FOR CARRYING OUT THE INVENTION

Figures 1, 2:
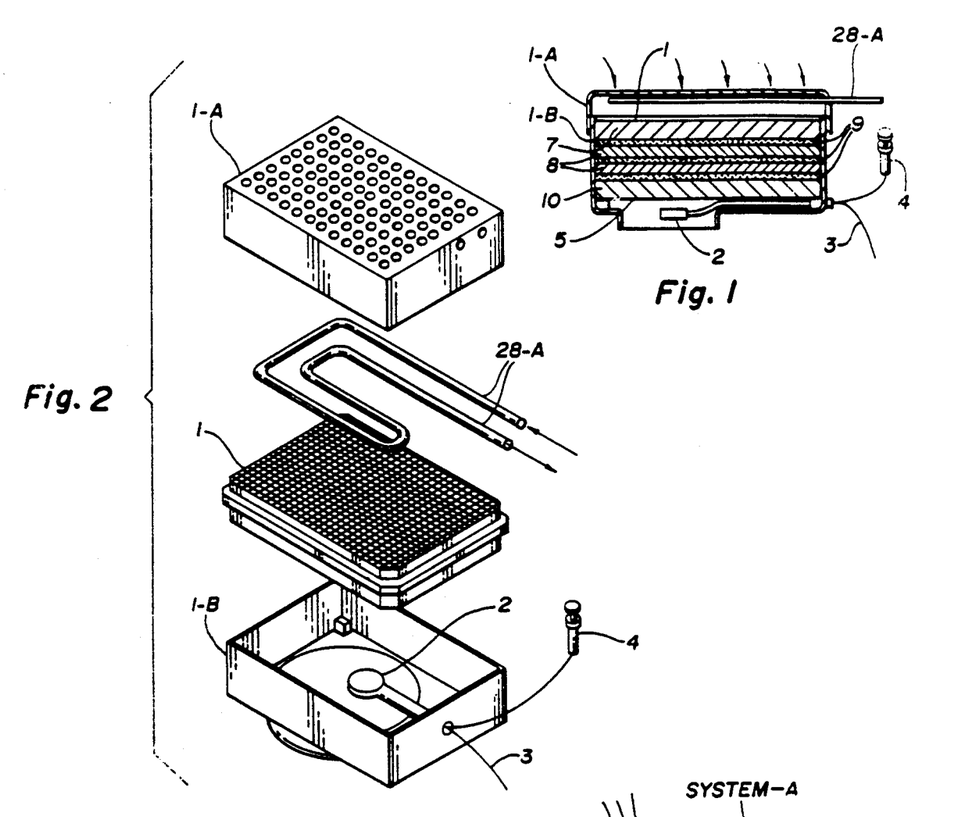
FIG. 1 is a cross-sectional view showing a first embodiment of a filter assembly of the present invention.
FIG. 2 is an exploded perspective view of the assembly.

What follows is a detailed description of the invention illustrated in the drawings and the construction of the main individual elements of this new invention. The filter assembly of the present invention is constructed to remove pollutants emitted from the exhaust fumes of the motor vehicles and also from the air existing in the motor vehicles, such as hydrocarbons, odors, soot, smoke, dust and allergens-pollen, for the benefit of the occupants of the motor vehicle. A container of housing of the assembly includes two parts: 1-A and 1-B, which house a filter element 1 for cleaning the air of pollution. The container parts 1A and 1B are shaped so that its largest cross sectional area (disposed in a horizontal plane as seen in FIG. 1) is substantially greater than the cross-sectional area of the air outlet and fresh air inlet 13A of the assembly. This improves the filtering capacity of the system.

Figures 11, 12:
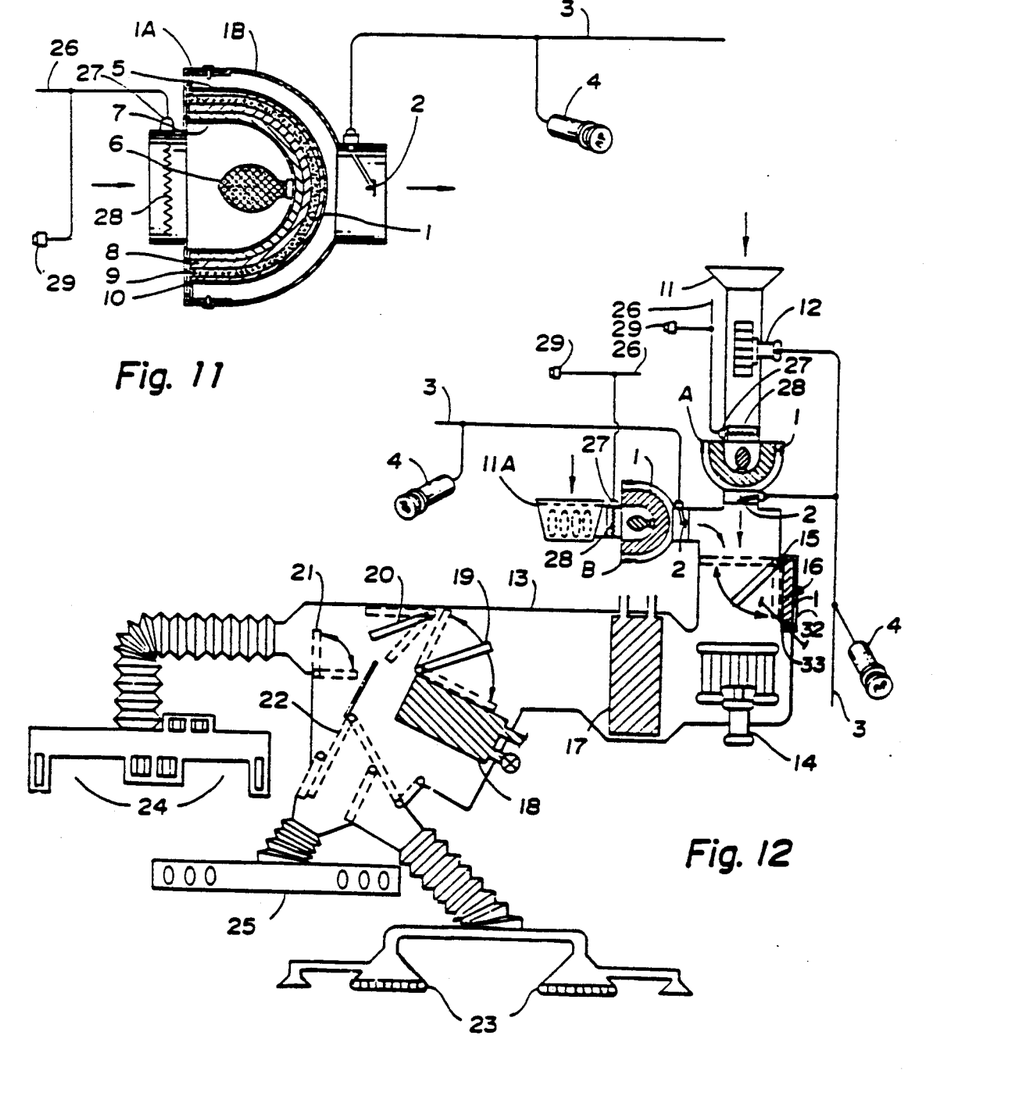
FIG. 11 is a sectional view of the combination filter of FIG. 10.
FIG. 12 is a diagrammatic view of the combination filter and an embodiment of the assembly in a conventional heating-cooling system.

The container part 1-A houses filament wire 28 in FIGS. 11 and 12 or tubing which defines a hot water heater 28A for protecting the filter element 1 from freezing and keeping the filter element 1 dry as shown in FIGS. 1-9.

The container 1-B houses a sensor switch 2 which notifies the driver whenever the filter element 1 becomes dirty.

Figure 3:
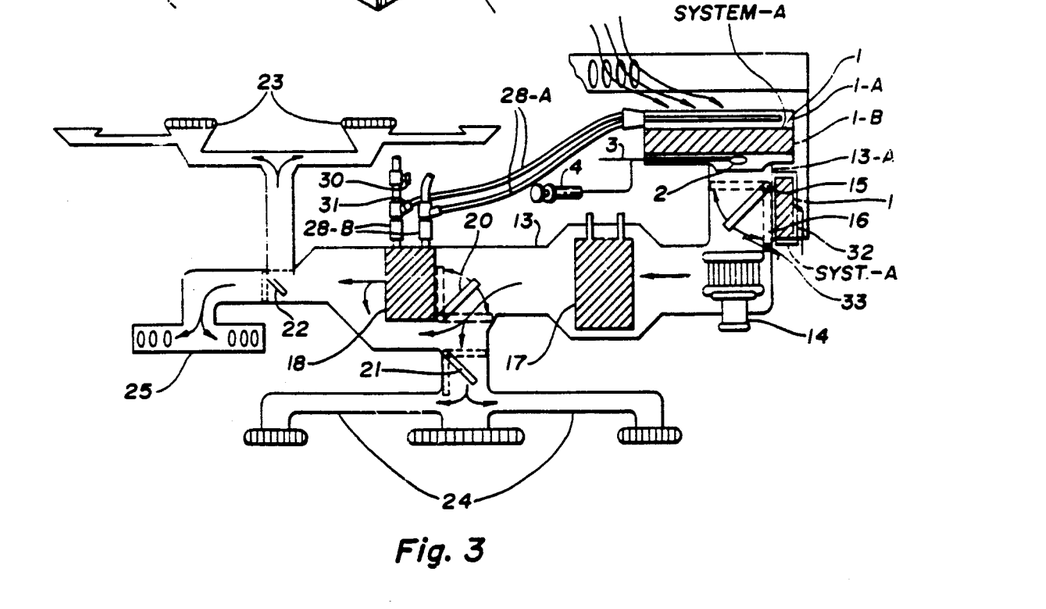
FIGS. 3 and 3-A are diagrammatic views of different embodiments of the assembly in a conventional heating-cooling system of a motor vehicle.

In system A, as shown in FIG. 3, the assembly includes the flat filter element 1 installed in a fresh air inlet 13-A and which is connected to the cowl plenum chamber 13. Also, in system A there is installed a filter element 1 in inlet 16 which is provided for re-circulating the air within the vehicle. A frame 32 holds the filter element 1. A valve means or mechanism 33 for regulation opens a door 15 for circulation of air. System A cleans the air which a blower 14 pulls from outside the vehicle, and existing air from inside the vehicle.

FIG. 3-A shows system B which uses a hot fluid/water heater in fresh air inlet 13-A and only one filter assembly which is installed in the plenum between the blower and evaporator, and also uses a valve 33. Similar to the valve 33 in this system only one filter assembly cleans the air which blower 14 pulls from outside the vehicle, and existing air from inside the vehicle.

Figure 4:
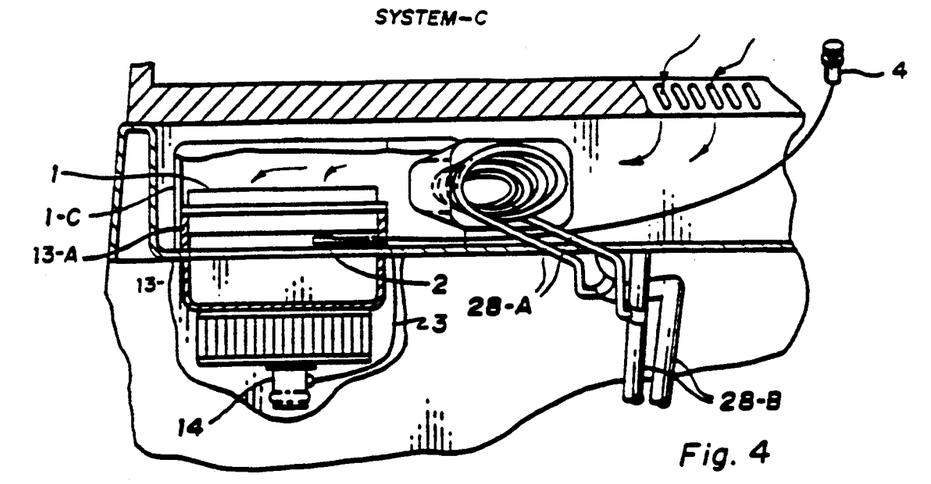
FIG. 4 is a side view, partially broken away and in cross-section, of a second embodiment of the assembly with its hot fluid heater and is installed in a fresh air inlet which is connected to the cowl plenum chamber of the vehicle.
Figure 5:
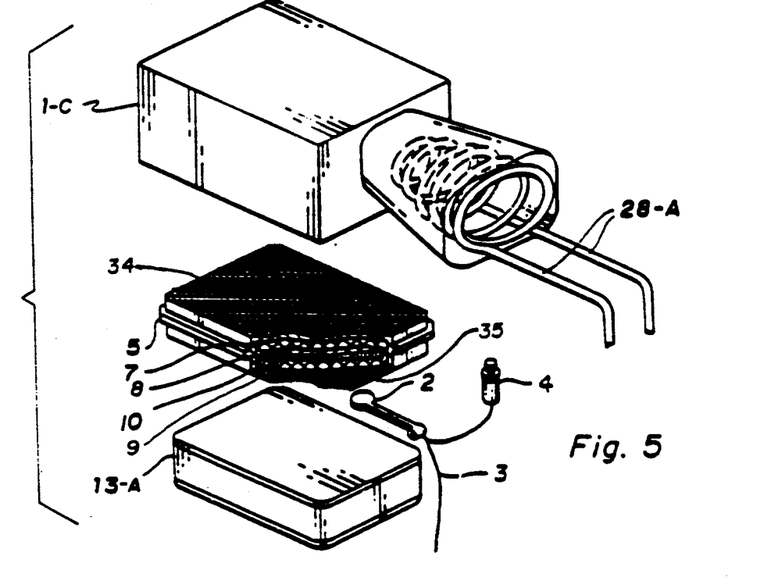
FIG. 5 is a exploded perspective view of the assembly of FIG. 4.
Figure 6:
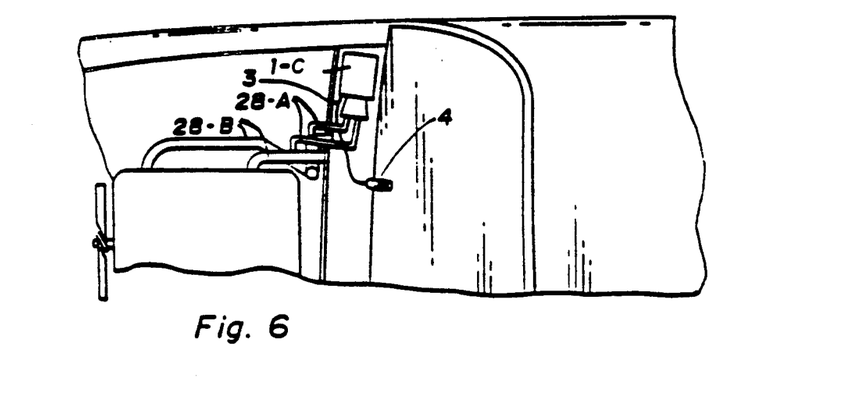
FIG. 6 is a side view, partially broken away, of the assembly of FIG. 4 installed in the vehicle.
Figure 7:
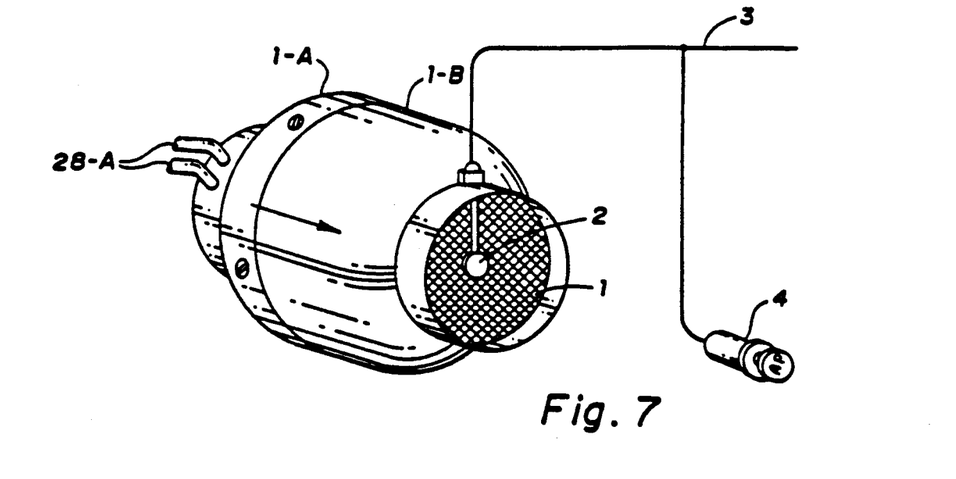
FIG. 7 is a perspective view of a third embodiment of the assembly.
Figure 8:
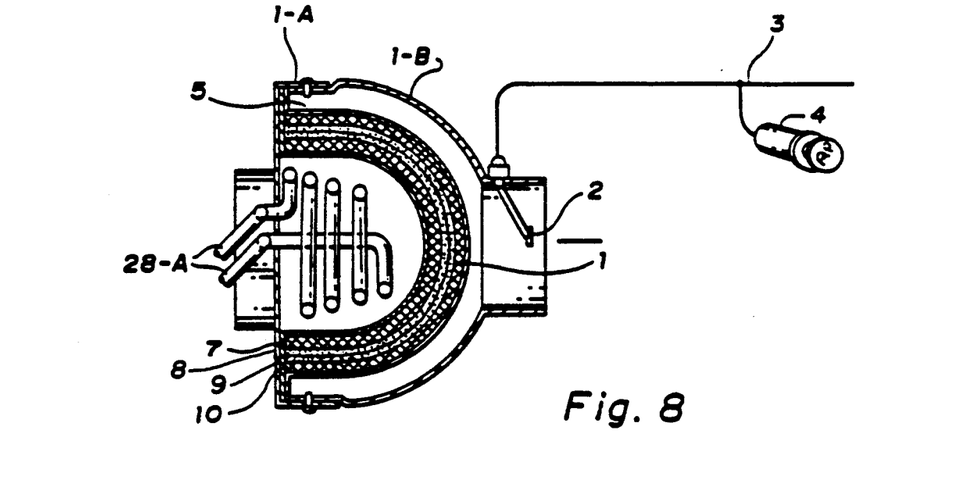
FIG. 8 is a sectional view of the assembly of FIG. 7.

In system C, as shown in FIGS. 4 through 6, the filter assembly includes the flat filter element 1 installed in a fresh air inlet 13-A and which is connected to the cowl plenum chamber 13. A cover 1-C supports a fresh air inlet and a hot fluid/water heater 28-A. The cover 1-C also covers a filter element 1 which is installed by a fresh air inlet 13-A. A fresh air inlet 13-A has an appropriate amount of square inches area to allow sufficient air to the interior vehicle. Also blower 14 is appropriately constructed to produce enough force to pull a sufficient amount of air through the filter.

Referring to FIGS. 1 and 5, a container 5 houses four different layers of filter components as well as a screen 34 at the inlet side and a screen 35 at the outlet side of the filter element 1. A screen 35 with special micro holes will prevent small particles of components of the filter from leaving the filter. The screens 34 and 35 are press fit together to hold the different layers together.

Figure 9:
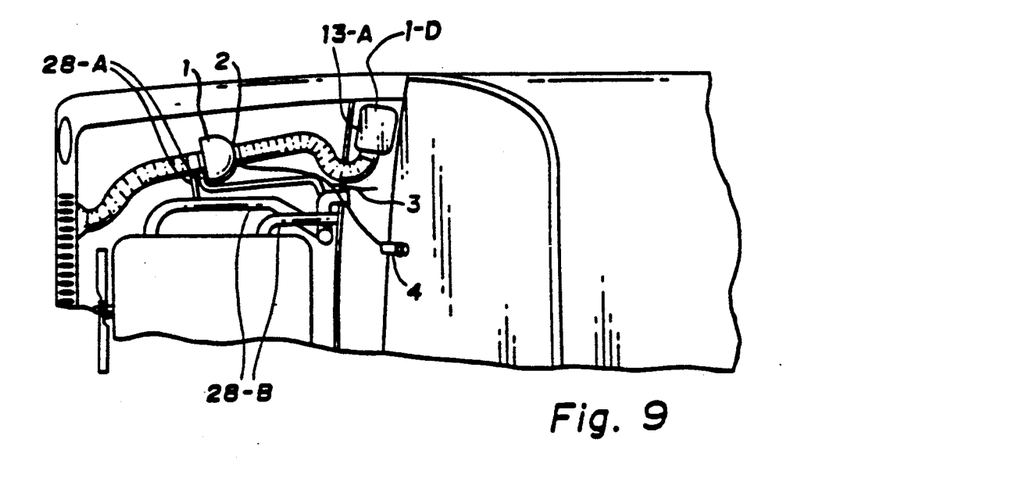
FIG. 9 is a side view, partially broken away, of the assembly FIG. 7 installed in a vehicle.
Figure 10:
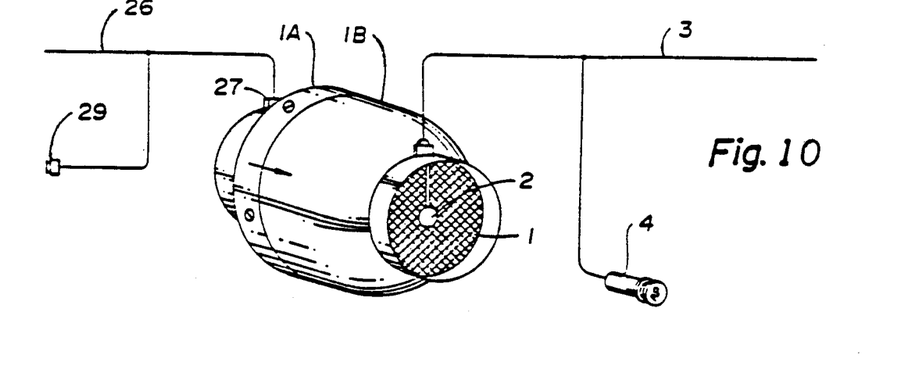
FIG. 10 is a perspective view of the combination filter of my prior patent No. 4,702,753.

Referring now to FIG. 9, a cover connector 1-D is used for installing a convex filter element 1 in a vehicle.

Referring to FIG. 12, a convex filter element 1 in assembly X-A and assembly X-B are installed in vent 11 or vent 1-A which is connected by a fresh air inlet 13-A to the cowl plenum chamber 13. A filter element 1 similar to the filter element 1 of FIG. 3 is provided in the inlet 16 for recirculation of air in the vehicle. The system of FIG. 12 also uses a valve 33, similar to the valve 33 of FIG. 3 to not only clean the air which the blower pulls from outside, but also existing air from inside the vehicle. A vent 11 or 11-A pulls into the vehicle by means of air resistance, which makes it easier to obtain sufficient air.

In each of the embodiments, electric power is connected via a conductive wire 3 to the sensor switch 2 via a conductive wire 3 to the warning light 4 on an instrument panel of the vehicle, to the blower 14, and to the vacuum blower 12 in vent 11 in system X-A or vent 11-A in system X-B.

Referring to FIG. 11, a screen 6 surrounds activated charcoal which absorbs hydrocarbons and odors. The screen 6 can be used with the convex filter when an electric heater is utilized and may be replaced.

A first layer 7 is mass at the appropriate quality water-resistant fibers, such as C15-150 or C15-250 media, manufactured by Filtrair BV of the Netherlands or PSF-10 or PSF-20 media, manufactured by Airguard Industries, Inc. of Louisville, Ky. The layer 7 collects dirt, dust and allergens-pollen. A second or third layer 8 is a thinner mass of the appropriate quality water-resistant polyester fibers such as PSF-11 or PSF-21 media, manufactured by Airguard Industries, Inc. of Louisville, Ky., laid out in such a way as to eliminate smaller pollution, particles including soot. A third or second layer 9 of granular charcoal is laid out in such amounts as to absorb hydrocarbons and odors and/or charcoal pad media manufactured by Lewcott Corporation of Millbury, Mass. If a greater amount of the activated charcoal is utilized to achieve a better quality filter, the activated charcoal can be formed into several thinner layers to allow for easier air flow. A layer 8 is then used to separate the layers of activated charcoal, as shown in FIG. 1. The final, fourth layer 10 is the thinnest mass of the appropriate quality, artificial, water-resistant fibers. We can use one of these several different filter mats, depending on whether we want a better quality filter or easier air flow. These filter mats are identified as Viledon filter mats A3/300s, PA/500, PA/560g, or Viledon R1 or C3-300 APB media, manufactured by Filtrair BV of the Netherlands, or air filter media manufactured by 3M Filtration Project of St. Paul, Minn., laid out so as to eliminate the smallest particles of pollution, including smoke particles.

Referring now to FIGS. 3 and 12, a heater plenum chamber 13 contains the necessary instruments that pull air from the exterior, clean it, cool or heat it, and conduct it to the appropriate outlets. The blower 14 pulls air in with appropriate force from the outside and forces it into the interior. A door 15 is provided which allows the air from the outside to enter the vehicle from inlet 11, 11A, or 13A through inlet 16 for the re-circulating air. An evaporator 17 cools the air. A heater core 18 heats the air. An air mix door 19 is provided by means of which we regulate the heating or cooling of the air, doors 20, 21, 22 are provided by means of which we regulate the flow of the air to the defroster vents 23, front vents 24 and floor vents 25.

Referring now to FIG. 12, the electric supply line 26 is connected to the electric filament wire 28 at an insulator 27 which is mounted on the inlet side of the container in the convex parts 1-A and also to the electric switch 29 which is inside the passenger compartment.

Referring now to FIG. 3, hot water heater 28-A is connected to hoses 28-B between the heater core and a heater control valve 30 which provides hot water to the heater core 18. If cool air is used, the valve 30 prevents the flow of hot water between the heater core 18 and the heater 28-A. In this way the hot water heater is connected to the heating-cooling system of the motor vehicle. A heater control valve 31 is used in the absence of a heater control valve 30.

While the best mode for carrying out the invention has been described in detail, those familiar with the art to which this invention relates will recognize various alternative designs and embodiments for practicing the invention as defined by the following claims.

What is claimed is:

1. In an air purification system for protecting motor vehicle occupants from pollution, the system adapted for a motor vehicle having a passenger compartment and a source of hot liquid for heating, and comprising:
   a plenum in communication with the passenger compartment of the vehicle, the plenum having
   a first air inlet adapted to receive outside air from outside the passenger compartment into said plenum,
   a second air inlet adapted to receive inside air from said passenger compartment into said plenum, and
   a blower operable to move air from said plenum into said passenger compartment,
   a filter with at least one replaceable filter element, located in said plenum downstream of the air inlets, for removing pollutants from the outside and/or from the inside air,
   door means located upstream of said filter and downstream of said air inlets, adapted to assume a plurality of positions in said plenum in blocking relationship to air being moved through said first air inlet and/or the second air inlet to selectively admit the outside air and/or the inside air to said blower, and
   a hot liquid heater located upstream of said filter in the path of the outside air and adapted to raise the temperature of the outside air for protecting said filter from freezing and for keeping it dry, the heater having heat exchange means for hot liquid from said hot liquid source.

2. In an air purification system for protecting motor vehicle occupants from pollution, the system adapted for a motor vehicle having a passenger compartment and a source of hot liquid for heating, and comprising:
   a plenum in communication with the passenger compartment of the vehicle, the plenum having
   a first air inlet adapted to receive outside air from outside the passenger compartment into said plenum,
   a second air inlet adapted to receive inside air from said passenger compartment into said plenum, and
   a blower operable to move air from said plenum into said passenger compartment, a first filter with at least one replaceable filter element, located in the first air inlet, for removing pollutants from the outside air, a second filter with at least one replaceable filter element, located in the second air inlet, for removing pollutants from the inside air, door means located downstream of said first and second filters and downstream of said air inlets, adapted to assume a plurality of positions in said plenum in blocking relationship to air being moved through said first air inlet and/or the second air inlet to selectively admit the outside air and/or the inside air to said blower, and a hot liquid heater located upstream of the first filter in the path of the outside air and adapted to raise the temperature of the outside air for protecting the first filter from freezing and for keeping it dry, the heater having heat exchange means for hot liquid from said hot liquid source.

3. The air purification system of claim 1 or claim 2 wherein the filter element of said filter or filters has multiple layers made from water-resistant fibers and activated charcoal to remove at least one of the following types of pollutants which are emitted from the exhaust fumes of the motor vehicle and/or from the passenger compartment of the motor vehicle: hydrocarbons, odors, smoke, soot, dust and allergen-pollen from the air passing therethrough.

* * * * *

UNITED STATES PATENT AND TRADEMARK OFFICE
CERTIFICATE OF CORRECTION

PATENT NO. : 5,004,487

DATED : April 2, 1991

INVENTOR(S) : Thaddeus Kowalczyk

It is certified that error appears in the above-identified patent and that said Letters Patent is hereby corrected as shown below:

The sheet of drawing consisting of Figures 4-6 should be deleted to appear as per attached sheet.

Signed and Sealed this

Twenty-fourth Day of September, 1991

Attest:

HARRY F. MANBECK, JR.

Attesting Officer     Commissioner of Patents and Trademarks